US010686783B2

(12) United States Patent
Rajagopal et al.

(10) Patent No.: US 10,686,783 B2
(45) Date of Patent: Jun. 16, 2020

(54) METHOD AND SYSTEM FOR ESTABLISHING A SECURE ACCESS CONNECTION WITH ELECTRONIC DEVICES

(71) Applicant: Wipro Limited, Bangalore (IN)

(72) Inventors: Harish Nair Rajagopal, Trivandrum (IN); Sujeet Sreenivasan, Bangalore (IN)

(73) Assignee: Wipro Limited, Bangalore (IN)

( * ) Notice: Subject to any disclaimer, the term of this patent is extended or adjusted under 35 U.S.C. 154(b) by 181 days.

(21) Appl. No.: 15/433,665

(22) Filed: Feb. 15, 2017

(65) Prior Publication Data

US 2018/0191717 A1 Jul. 5, 2018

(30) Foreign Application Priority Data

Dec. 30, 2016 (IN) .............................. 201641045049

(51) Int. Cl.
*H04W 12/06* (2009.01)
*H04L 29/06* (2006.01)
*H04W 12/08* (2009.01)

(52) U.S. Cl.
CPC ........ *H04L 63/0876* (2013.01); *H04L 63/107* (2013.01); *H04L 63/108* (2013.01);
(Continued)

(58) Field of Classification Search
CPC . H04L 63/0876; H04L 63/107; H04L 63/108; H04L 63/14; H04W 12/06; H04W 12/02; H04W 12/08
See application file for complete search history.

(56) References Cited

U.S. PATENT DOCUMENTS 8,646,074 B1 2/2014 Gangadharan
8,850,588 B2 9/2014 Kumar et al.
(Continued)

FOREIGN PATENT DOCUMENTS

EP 3343863 * 7/2018

OTHER PUBLICATIONS

Singh et al., "Twenty security considerations for cloud-supported Internet of Things", Internet of Things Journal, IEEE, Jun. 1, 2016, pp. 1-10.*

(Continued)

*Primary Examiner* — Tongoc Tran
(74) *Attorney, Agent, or Firm* — Finnegan, Henderson, Farabow, Garrett & Dunner, LLP (57) ABSTRACT

A technique is provided for establishing a secure access connection with electronic devices. The technique includes receiving a request for establishing the secure access connection, from an electronic device, via an access point associated with the electronic device. The technique further includes dynamically determining at least a local reputation score associated the access point, based on at least a plurality of parameters and pre-defined weights assigned to each of the plurality of parameters. The technique further includes establishing the secure access connection between the host device and the electronic device, via the access point, based on a comparison of an updated global reputation score with a pre-defined threshold. The global reputation score is updated based on the dynamically determined local reputation score.

14 Claims, 4 Drawing Sheets

Method 300 for establishing a secure access connection with electronic devices (52) U.S. Cl.
CPC ............. *H04L 63/14* (2013.01); *H04W 12/06* (2013.01); *H04W 12/08* (2013.01)

(56) References Cited

U.S. PATENT DOCUMENTS

| | | | |
|---|---|---|---|
| 2009/0125980 A1* | 5/2009 | Alperovitch | G06Q 10/06 726/3 |
| 2013/0040603 A1* | 2/2013 | Stahlberg | H04L 63/126 455/410 |
| 2013/0254831 A1* | 9/2013 | Roach | H04L 63/107 726/1 |
| 2016/0007278 A1* | 1/2016 | Gupta | H04W 76/10 370/329 |
| 2016/0050940 A1* | 2/2016 | Gomez Jimenez | A21C 13/00 99/468 |
| 2017/0126705 A1* | 5/2017 | Mirashrafi | H04W 12/06 |

OTHER PUBLICATIONS

Yang et al., "Direct Versus Iterative Model Updating Methods for Mass and Stiffness Matrics", International Journal of Structural Stability and Dynamics, vol. 10, No. 02, pp. 165-186 (2010).*

* cited by examiner

FIG. 1: System Environment 100

FIG. 2: Host Device 102

FIG. 3: Method 300 for establishing a secure access connection with electronic devices FIG. 4: Example Computer System

METHOD AND SYSTEM FOR ESTABLISHING A SECURE ACCESS CONNECTION WITH ELECTRONIC DEVICES

This application claims the benefit of Indian Patent Application Serial No. 201641045049, filed Dec. 30, 2016, which is hereby incorporated by reference in its entirety.

FIELD

This disclosure relates generally to establishing secure access connection, and more particularly to system and method for establishing a reputation score based secure access connection with an electronic device in a network environment.

BACKGROUND

Advancements in the field of network environments, such as Internet of Things (IoT) environment, have led to development of mechanism for providing connectivity between sensors, devices, people and cloud services. Such mechanisms make use of cryptographically secured connectivity between the electronic devices, in order to preserve confidentiality, integrity, and authenticity of the entities involved. The pairing of the electronic devices in the IoT environment is performed by a user following which the connection between the electronic devices takes place via one or more access points. Further, such a connection is assumed to be secure. The information corresponding to the connection is stored, and is referenced each time the electronic devices are in the vicinity of each other and are required to be connected.

In certain scenarios, because of the inherent assumption of security cited above, the connectivity between the electronic devices may be susceptible to fake or rogue electronic devices that may disconnect the verified electronic devices. Further, such fake electronic devices may be paired to the electronic devices in the network, after disconnecting the verified electronic devices. There is no mechanism in the electronic devices to analyze such events and detect if an intrusion from a fake electronic device is being done. Consequently, the security of the electronic device may be compromised leading to loss of sensitive data. Furthermore, there is no mechanism by which the electronic device may monitor the network and provide a feedback to a user upon detection of a fake device.

Therefore, there exists a need for keeping the connectivity between the electronic devices secure not only during the pairing stage but constantly throughout the time duration for which the connection is maintained.

SUMMARY

In one embodiment, a method of establishing a secure access connection with electronic devices is disclosed. In one example, the method includes receiving a request for establishing the secure access connection, from an electronic device, via an access point associated with the electronic device. The method further includes dynamically determining at least a local reputation score associated with the access point. The reputation score may be based on at least a plurality of parameters and pre-defined weights assigned to each of the plurality of parameters. The method further includes establishing the secure access connection between the host device and the electronic device, via the access point. The connection may be based on a comparison of an updated global reputation score with a pre-defined threshold. Further, the global reputation score may be updated based on the dynamically determined local reputation score.

In another embodiment, a system is disclosed for establishing a secure access connection with electronic devices. The system includes a processor and a memory communicatively coupled to the processor. The memory stores processor-executable instructions, which, on execution, cause the processor to receive a request for establishing the secure access connection, from an electronic device, via an access point associated with the electronic device. The processor-executable instructions, on execution, further cause the processor to dynamically determine at least a local reputation score associated the access point. The reputation score may be based on at least a plurality of parameters and pre-defined weights assigned to each of the plurality of parameters. The processor-executable instructions, on execution, further cause the processor to establish the secure access connection between the host device and the electronic device, via the access point. The connection may be based on a comparison of an updated global reputation score with a pre-defined threshold. The global reputation score may be updated based on the dynamically determined local reputation score.

In yet another embodiment, a non-transitory computer-readable medium storing computer-executable instructions for establishing a secure access connection with electronic devices is disclosed. In one example, the stored instructions, when executed by a processor, cause the processor to perform operations comprising receiving a request for establishing the secure access connection, from an electronic device, via an access point associated with the electronic device. The operations further include dynamically determining at least a local reputation score associated the access point. The reputation score may be based on at least a plurality of parameters and pre-defined weights assigned to each of the plurality of parameters. The operations further include establishing the secure access connection between the host device and the electronic device, via the access point. The connection may be based on a comparison of an updated global reputation score with a pre-defined threshold. The global reputation score may be updated based on the dynamically determined local reputation score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
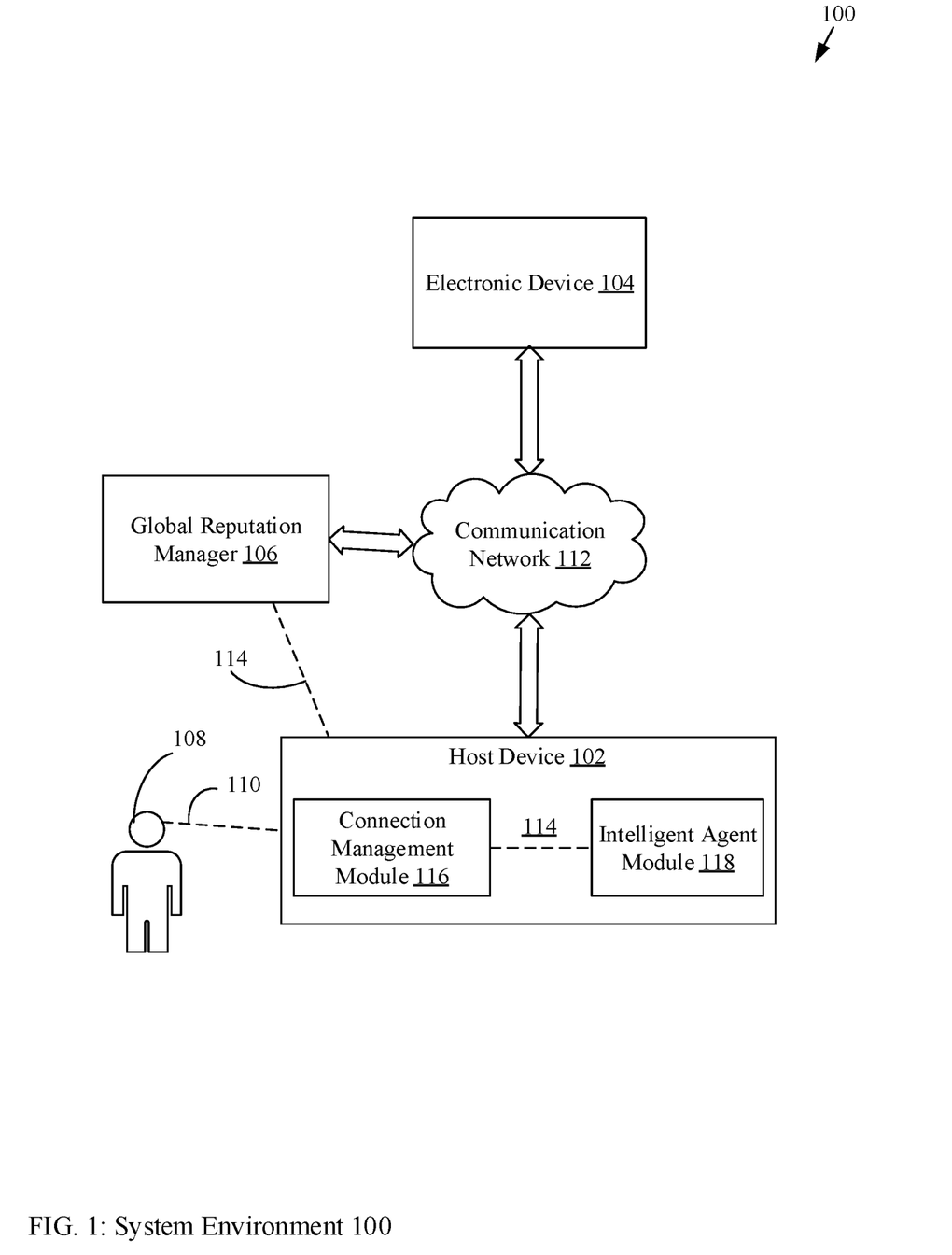
FIG. 1 is an exemplary network environment for establishing a secure access connection with electronic devices, in accordance with some embodiments of the present disclosure.

Referring now to FIG. 1, an exemplary network environment 100 for establishing a secure access connection with electronic devices is shown in accordance with some embodiments of the present disclosure. As will be described in greater detail in conjunction with FIG. 2.

The network environment 100 includes a network of computing devices (e.g., a computer, a server, a digital device, a router, a modem, a bridge, a switch, etc.) for sending or receiving various data. In one embodiment, the network environment 100 includes a host device 102, an electronic device 104, and a global reputation manager 106. The host device 102 may be associated with a user 108, via an interface 110. Further, the host device 102, the electronic device 104, and the global reputation manager 106 may be communicatively coupled to each other, via the communication network 112. Specifically, the global reputation manager 106 may be communicatively coupled to the host device 102, via the interface 114. Each of the computing devices further includes one or more processors and a computer-readable medium (e.g., a memory). The computer-readable storage medium stores instructions that, when executed by the one or more processors, cause the one or more processors to perform data reception and transmission in accordance with aspects of the present disclosure. The computer-readable storage medium may also store various data (e.g., optimal network path, optimal packet size, data packets, current packet size of a node, etc.) that may be captured, processed, and/or required by the network environment 100.

The host device 102 may include suitable logic, circuitry, interfaces, and/or code for displaying one or more user interfaces to the user 108 on via a display screen (not shown). Based on the user interface, the user 108 may be able to view information corresponding to the one or more electronic devices, such as the electronic device 104. The host device 102 may include a connection management module 116 and an intelligent agent module 118. The aforementioned modules may use the interface 114 for communication with each other. The host device 102 may further interact with the global reputation manager 106 to retrieve and/or update the reputation score of access points of one or more electronic devices in the network environment 100. A person of ordinary skill in the art will appreciate that in an implementation, the global reputation manager 106 may be integrated into the host device 102. Examples of the host device 102 may include, but are not limited to, a smartphone, a camera, a tablet computer, a laptop, a wearable electronic device, and/or other such computing devices. Examples of implementation of the display screen of the electronic device 104 may include, but are not limited to, a Liquid Crystal Display (LCD) display, a Light Emitting Diode (LED) display, an Organic LED (OLED) display technology.

The electronic device 104 may include suitable logic, circuitry, interfaces, and/or code that may enable the electronic device 104 to be communicatively coupled with the host device 102. The electronic device 104 may include an access point, via which the communication messages to and from the host device 102 may be routed. Examples of the host device 102 may include, but are not limited to, a smartphone, a camera, a tablet computer, a laptop, a wearable electronic device, and/or other such computing devices.

The global reputation manager 106 may include suitable logic, circuitry, interfaces, and/or code through which the global reputation manager 106 maintains a global reputation score of the access points associated with one or more electronic devices present in the network environment 100. The global reputation manager 106 interacts with the host device 102 to receive a locally determined reputation score. The global reputation manager 106 further updates the global reputation score based on the local reputation score. Further, the global reputation manager 106 may transmit the global reputation score, when queried by the host device 102. The implementation of the global reputation manager 106 may be based on one or more database technologies known in the art.

The communication network 112 may include a medium through which the electronic device 104 and the remote device 108 present in the network environment 100 may communicate with each other. Examples of the communication network 112 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 112, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

In operation, the host device 102 may receive one or more requests, from the one or more electronic devices, for establishing the secure access connection, via access point of the one or more electronic devices. The host device 102 may display the received one or more requests on the display screen, to the user 108, to notify the user 108 about the one or more requests. Based on the received requests, the user 108 may provide confirmation that corresponds to the consent for providing secure access connection of an electronic device, with the host device 102. In an embodiment, the display screen may include an interface 110 that may communicate the messages to the user 108 using notifications, pop-ups, and/or synchronous or asynchronous mechanisms known in the art.

In an embodiment, the host device 102 may be configured to perform scanning of the vicinity of the host device 102, for detecting the presence of one or more electronic devices. Based on the scanning, the host device 102 may detect the one or more electronic devices, such as the electronic device 104. The host device 102 may present the information corresponding to the presence of the electronic device 104 on the display screen of the host device 102. The request for establishing the secure access connection may be received from the one or more electronic devices, based on selection of an electronic device (such as the electronic device 104) from the list of displayed one or more electronic devices. In an embodiment, the request may be received by the connection management module 116, via the communication network 112. Further, in an embodiment, the received one or more requests for secure access connection may correspond to a secure access IoT gateway.

Based on the received request, the host device 102 may dynamically determine a local reputation score of the access point associated with the electronic device 104. The determination of the local reputation score may be based on a plurality of parameters and pre-defined weights assigned to each of the plurality of parameters. In an embodiment, the weights for determining the local reputation score may be user configurable. In an embodiment, the plurality of parameters may include, but are not limited to, a data transfer speed associated with the access point, a delay in data transfer associated with the access point, a jitter associated with the access point, an uptime of the access point, an availability status of the access point for communication, a number of network nodes connected to the access point, and encryption modes used for communication via the access point. In an embodiment, the local reputation score may be determined based on at least a pre-defined time interval or a change in the plurality of parameters. Such a pre-defined time interval may be user configurable.

In an embodiment, the request may be received from the electronic device 104 for the first time. In such a scenario, the host device 102 may generate a unique identifier corresponding to the access point of the electronic device 104. The host device 102 may further store the determined local reputation score in a local database, corresponding to the generated unique identifier.

In an embodiment, the host device 102 may transmit the dynamically determined local reputation score to the global reputation manager 106. The global reputation manager 106 may determine a global reputation score based on a weighted analysis of a user defined reputation score and the local reputation score, corresponding to the access point of the electronic device 104. The global reputation manager 106 may assign a weightage to each of the user defined reputation score and the local reputation score to determine the global reputation score. In an embodiment, the weights for determining the global reputation score may be user configurable. The determined global reputation score may be transmitted to the host device 102. In an embodiment, the global reputation score manager 106 may be stored the determined global reputation score.

In an embodiment, the intelligent agent module of 118 may receive the local reputation score from the connection management module, via the interface 114. In an embodiment, the interface 114 may be implemented based on service bus, Representational State Transfer (REST) applications, Remote Procedure Calls (RPC), and/or message passing mechanisms.

The intelligent agent module 118 may retrieve a pre-defined threshold from a local memory associated with the host device 102. The intelligent agent module 118 may compare the pre-defined threshold with the updated global reputation score. Based on the comparison, the connection management module 116 may establish the secure connection between the host device 102 and the electronic device 104, via the access point of the electronic device 104. In an embodiment, when the request for establishing the secure access connection is received from the electronic device 104 for which the unique identifier pre-exists in the host device 102, the connection management module 116 may establish the connection directly without requiring any validation input from the user 108. The host device 102 may dynamically determine the local reputation score. Further, the host device 102 may compare the global reputation score (updated based on the determined local reputation score) with the pre-defined threshold. Based on the comparison, the host device 102 may establish a secure access connection with the aforementioned electronic device.

Figure 2:
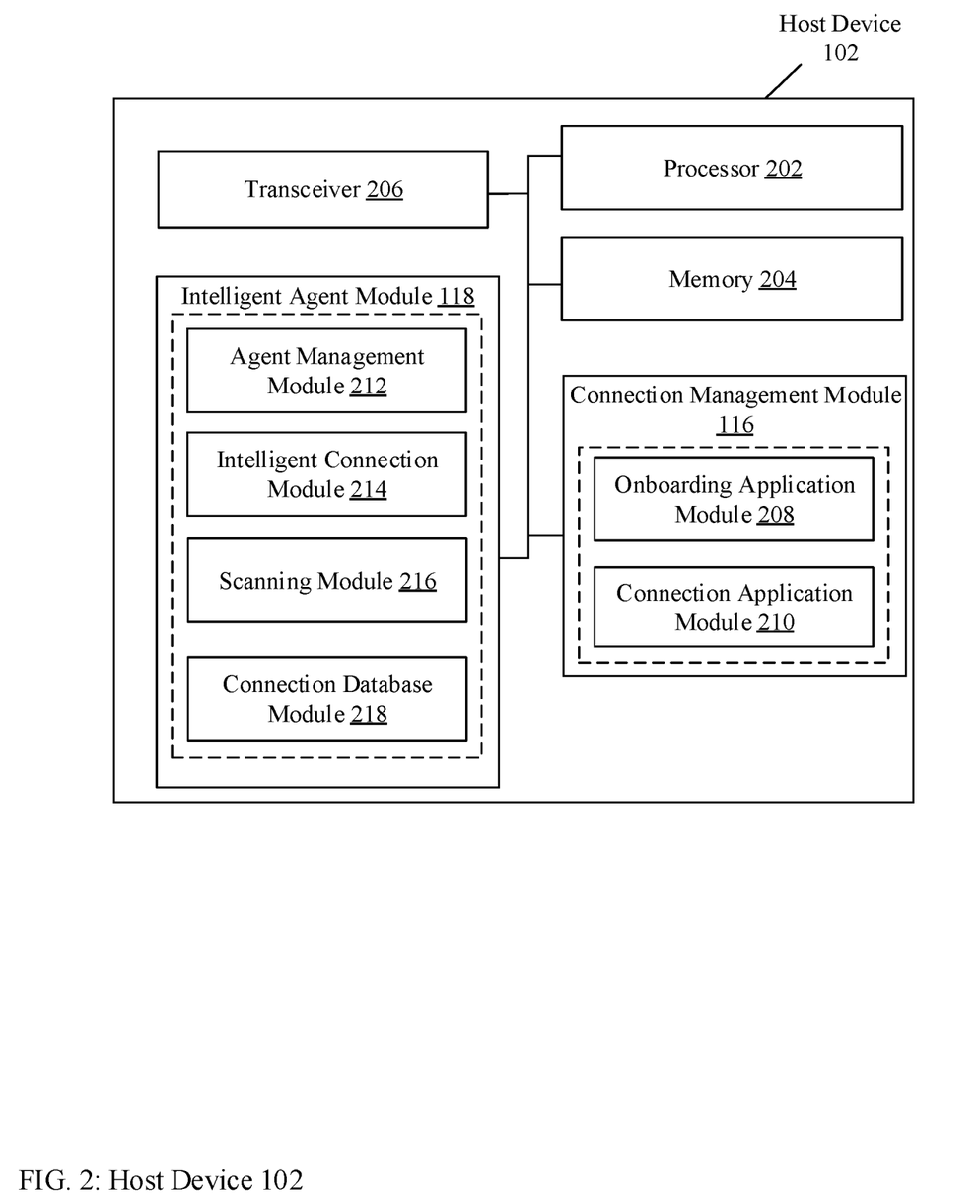
FIG. 2 is a block diagram of exemplary system for establishing a secure access connection with electronic devices, in accordance with some embodiments of the present disclosure.

FIG. 2 is a block diagram of exemplary system for establishing a secure access connection with electronic devices, in accordance with some embodiments of the present disclosure. FIG. 2 is explained in conjunction with elements from FIG. 1. With reference to FIG. 2, there is shown the host device 102. The host device 102 may include one or more processors, such as a processor 202, and a memory 204, a connection management module 116, an intelligent agent module 118, and a transceiver. The connection management module 116 may include an onboarding application module 208 and a connection application module 210. The intelligent agent module 114 may include an agent management module 212, an intelligent connection module 214, a scanning module 216, and a connection database module 218.

The processor 202 may include suitable logic, circuitry, interfaces, and/or code that may be configured to execute a set of instructions stored in the memory 204. The processor 202 may be configured to receive one or more request for providing secure access connection with one or more electronic devices. Based on the received one or more requests, the processor 202 may dynamically determine reputation score corresponding to the access point of an electronic device. The secure connection with an electronic device may be based on the determined reputation score. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may include suitable logic, circuitry, and/or interfaces that may be configured to store a machine code and/or a computer program with at least one code section executable by the processor 202. In an embodiment, the memory 204 may be configured to store a pre-defined threshold for comparing a reputation score. In an implementation, the connection database module 218 may be integrated with the memory 204. In such an implementation, the memory 204 may store a unique identifier corresponding to an electronic device with which the secure access connection is established. Examples of implementation of the memory 204 may include, but are not limited to, Random Access Memory (RAM), Read Only Memory (ROM), Hard Disk Drive (HDD), and/or a Secure Digital (SD) card.

The transceiver 206 may include suitable logic, circuitry, interfaces, and/or code that may be configured to communicate with another electronic device 104 or the global reputation manager 106, via the communication network 112. The transceiver 206 may implement known technologies to support wired or wireless communication. The transceiver 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), Long Term Evolution (LTE), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The connection management module 116 may include suitable logic, circuitry, interfaces, and/or code that may be used to connect to an access point of an electronic device. The connection management module 116 may be communicatively coupled to the intelligent agent module 118, via the interface 114. The onboarding application module 208 may be configured to establish a connection with an electronic device, such as the electronic device 104. The connection application module 210 may be configured to establish a connection with an electronic device to which the connection has already been established at least once. The connection application module 210 (via the interface 110) is configured to display a list of the electronic devices with which the host device may be connected. The connection management module 116 may be implemented as one or more processors, based processor technologies known in the art.

The intelligent agent module 118 may include suitable logic, circuitry, interfaces, and/or code that may serve as an interface between the user 108 and the electronic devices. The agent management module 212 may be configured to receive one or more requests establishing the secure access connection, via the interface 114. The agent management module 212 may be further configured to validate data including the details of the access point of the electronic device requesting the secure access connection.

The intelligent connection module 214 may be configured to use the connection details provided by the agent management module 212 and generate a unique identifier for an electronic device. The unique identifier may be used to query the connection database module 218 to check whether the electronic device requesting secure access connection is registered with the system. The intelligent connection module 214 may be further configured to refer to the data obtained by the scanning module 216 to check the list of devices which are available in the vicinity at that specific instance. The data from the database and the data passed by the agent management module may be validated to determine whether a request for a secure access connection is received from a known device.

The scanning module 216 of the intelligent agent module 118 may be configured to scan the vicinity of the host device 102 to detect one or more electronic devices. The scanning may be performed periodically based on a user defined time interval. In an implementation, the result of the scanning is communicated to the intelligent connection module 214. The connection database module 218 may be configured to store the details of the access points and a local reputation score of an electronic device. The connection database module 218 may be queried and updated by the intelligent connection module 214.

In operation, the host device 102 may be configured in an operational mode where it may receive one or more requests for establishing secure access connection, from one or more electronic devices (such as the electronic device 104). In such a mode of operation, the processor 202 may be configured to receive one or more requests, from the one or more electronic devices, for establishing the secure access connection. The processor 202 may be configured to notify the user 108 about the one or more requests, via the interface 110 (as explained in FIG. 1) on the display screen. Based on the received requests, the user 108 may provide confirmation that corresponds to the consent for providing secure access connection of an electronic device, with the host device 102.

In an embodiment, the scanning module 216 may be configured to perform scanning of the vicinity of the host device 102 in order to detect the presence of one or more electronic devices. Based on the scanning, the scanning module 216 may detect the one or more electronic devices, such as the electronic device 104.

In an embodiment, the agent management module 212 may be configured to receive the request for establishing the secure access connection, from the connection management module 116. The received request may include data including the details of the access point of the electronic device 104. In an embodiment, the data may include, but is not limited to, Extended Service Set Identification (ESSID) of the electronic device 104, encryption technique used for communication with the electronic device 104, ciphering technique used for communication with the electronic device 104, channel number, and/or a user defined reputation of the access point of the electronic device 104. The agent management module 212 may be further configured to validate the received data of the access point. The result of the validation is communicated to the intelligent connection module 214.

In an embodiment, the intelligent connection module 214 may be configured to query the connection database 218 to determine whether the electronic device 104 is detected for the first time by the scanning module 216. In scenarios, when the electronic device 104 is detected for the first time, the intelligent connection module 212 may generate a unique identifier corresponding to the access point of the electronic device 104. The generated unique identifier may be stored in the connection database 218. In scenarios, when the detected electronic device 104 corresponds to a previously detected (and/or paired) electronic device, the connection application module 210 may be configured to notify the user 108 about the presence of the electronic device 104. In an embodiment, the notification about the presence of the electronic devices in the vicinity of the host device 102 may be based on the interface 110, via a list of detected electronic devices, pop-ups, and/or synchronous or asynchronous mechanisms known in the art. Based on the displayed notification, the user 108 may provide one or more inputs for management of secure access connection with an electronic device.

In an embodiment, when the user input is provided corresponding to the electronic device 104, the intelligent connection module 214 may be configured to dynamically determine a local reputation score of the access point associated with the electronic device 104. The determination of the local reputation score may be based on a plurality of parameters and pre-defined weights assigned to each of the plurality of parameters. In an embodiment, the weights for determining the local reputation score may be user configurable. The plurality of parameters associated with the access point of the electronic device 104 may include, but is not limited to, a data transfer speed associated with the access point, a delay in data transfer associated with the access point, a jitter associated with the access point, an uptime of the access point, an availability status of the access point for communication, a number of network nodes connected to the access point, and encryption modes used for communication via the access point. In an embodiment, the determined local reputation score (of the access point) corresponding to the unique identifier of the electronic device 104, may be stored in the connection database module 218.

In an embodiment, the dynamically determined local reputation score may be transmitted to the global reputation manager 106, via the transceiver 206. The global reputation manager 106 may determine a global reputation score based on a weighted analysis of a user defined reputation score and the local reputation score. The global reputation manager 106 may assign a weightage to each of the user defined reputation score and the local reputation score to determine the global reputation score. In an embodiment, the weights for determining the global reputation score may be user configurable. The determined global reputation score may be transmitted to the host device 102. In an embodiment, the global reputation score manager 106 may be stored the determined global reputation score. A person of ordinary skill in the art will appreciate that in an implementation, the global reputation manager 106 may be integrated with the host device as a module that may receive instructions for performing the aforementioned, from the processor 202.

The host device 102 may be configured to receive the global reputation score, via the transceiver 206. The intelligent agent module 118 may be configured to compare the received global reputation score with the pre-defined threshold. The pre-defined threshold may be retrieved from the memory 204. In scenarios, based on the comparison, the intelligent agent module 118 may be configured to automatically establish secure access connection with the electronic device 104. In certain other scenarios, the intelligent agent module 118 may be configured to notify the result of the comparison to the user 108. Based on a user input provided by the user 108 corresponding to the notification, the connection management module 116 may establish the secure access connection with the electronic device 104. Once the connection is established, the connection management module 116 may store the unique identifier of the electronic device 104 for future reference.

Figure 3:
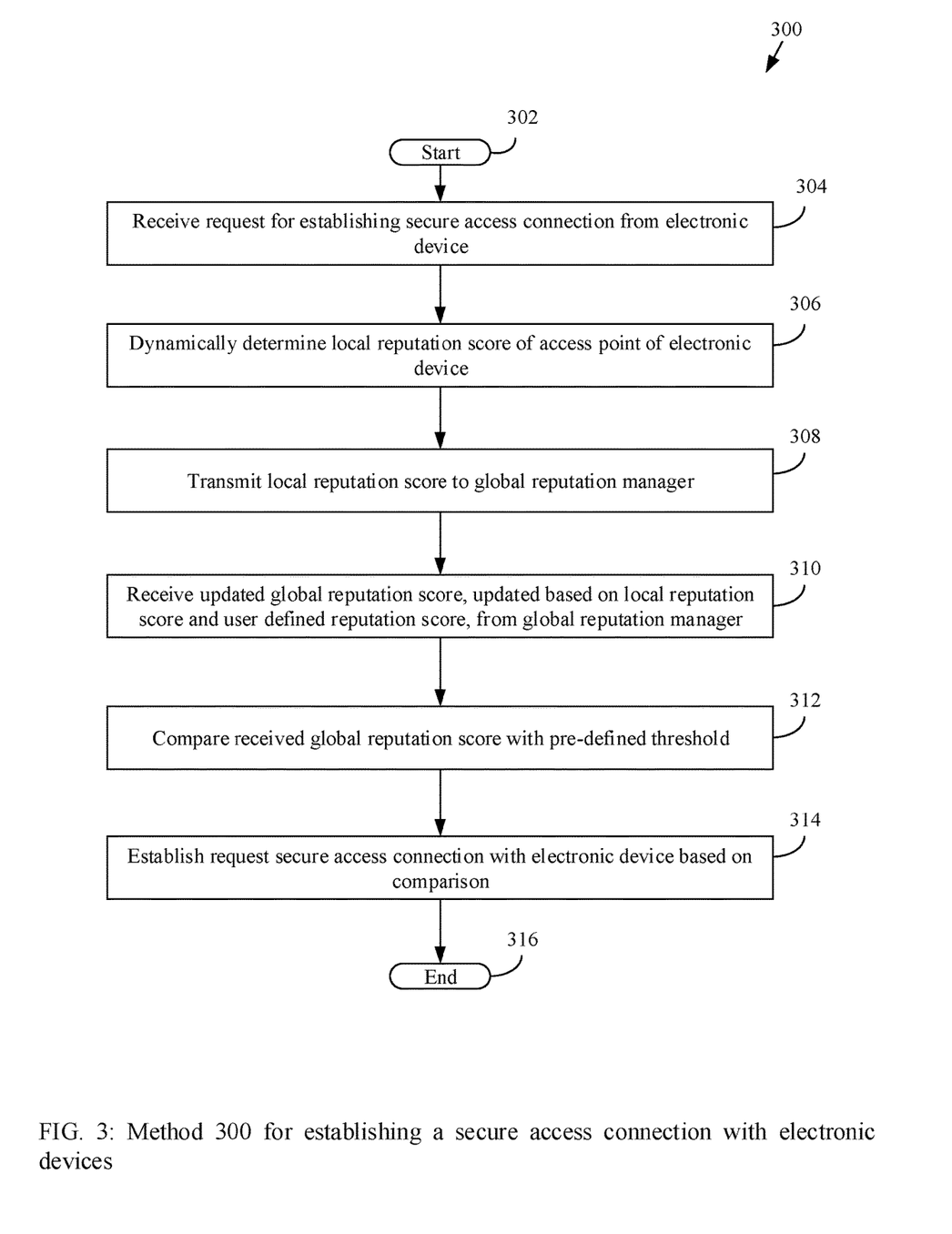
FIG. 3 is a flow diagram of a detailed exemplary process for establishing a secure access connection with electronic devices, in accordance with some embodiments of the present disclosure.

FIG. 3 is a flow diagram of a detailed exemplary process for establishing a secure access connection with electronic devices, in accordance with some embodiments of the present disclosure. With reference to FIG. 3, there is shown a flow chart 300. The flow chart 300 is described in conjunction with FIGS. 1 and 2. The process starts at step 302 and proceeds to step 304.

At step 304, a request for establishing the secure access connection with the host device 102 may be received from the electronic device 104. The request may be received via the access point associated with the electronic device 104. At step 306, a local reputation score, corresponding to the access point of the electronic device 104, may be dynamically determined by the host device 102. The determination of the local reputation score may be based on a plurality of parameters associated with the access point of the electronic device 104. The local reputation score may be further based on the weights assigned to each of the aforesaid plurality of parameters.

At step 308, the local reputation score may be transmitted to the global reputation manager 106. At step 310, an updated global reputation score may be received from the global reputation manager 106. In an embodiment, the global reputation score of the access point of the electronic device 104 may be updated by the global reputation manager 106 based on the received local reputation score and a user defined reputation score of the access point of the electronic device 104. A person of ordinary skill in the art will appreciate that the local reputation score may be updated dynamically by the host device 102 based on a change in the plurality of parameters and/or a user defined time interval. Consequently, based on the change in the local reputation score, the global reputation score may be updated.

At step 312, the received global reputation score may be compared with a pre-defined threshold. At step 314, based on the comparison, the requested secure access connection may be established between the host device 102 and the electronic device 104. The control passes to end step 316.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
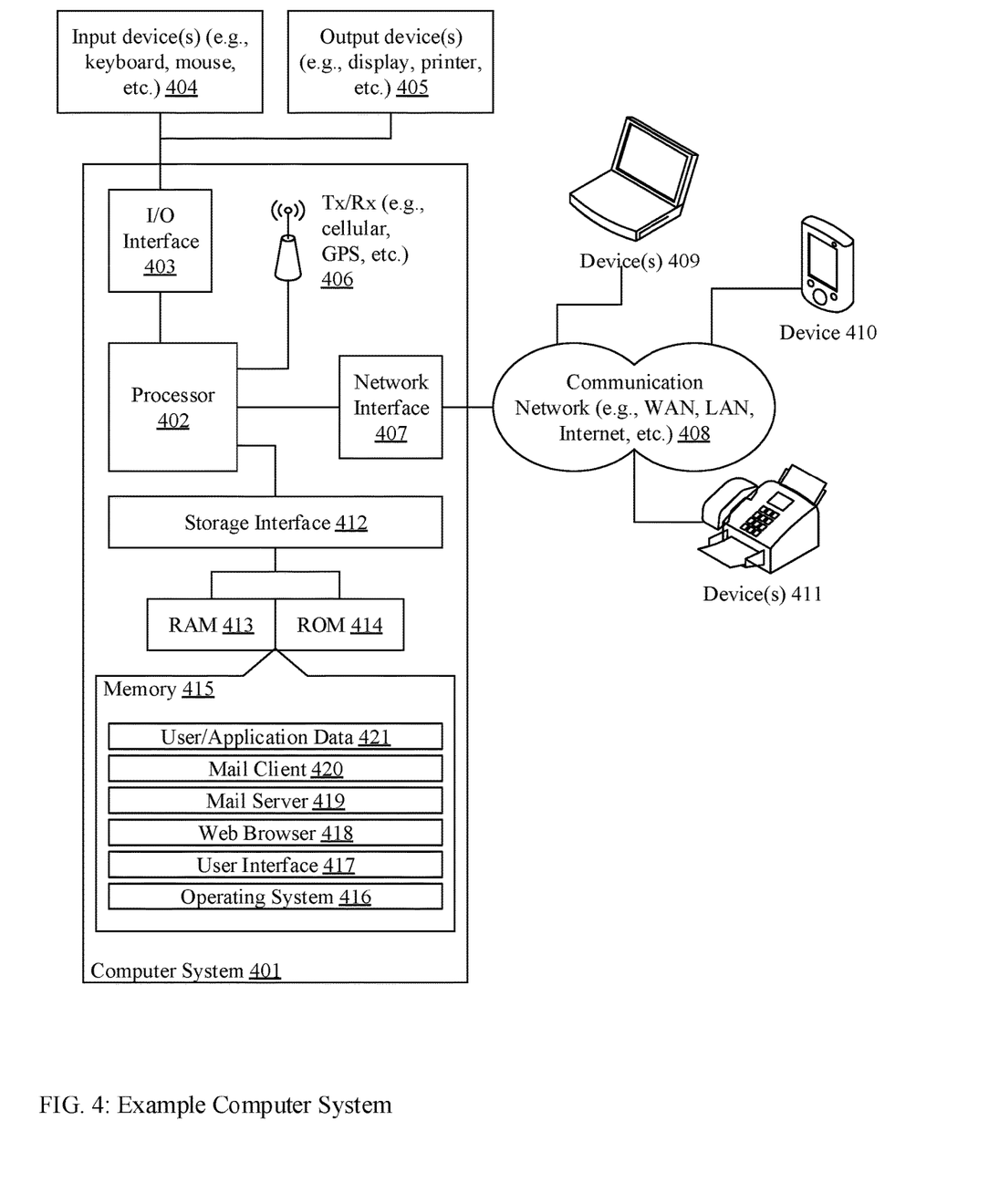
FIG. 4 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 401 for implementing embodiments consistent with the present disclosure is illustrated. Variations of computer system 401 may be used for implementing network environment 100 for transmitting data over a communication network. Computer system 401 may include a central processing unit ("CPU" or "processor") 402. Processor 402 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403.

The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for establishing a secure access connection with electronic devices, thereby enhancing the security of the devices present in an IoT network. The enhanced security may be based on dynamically updated reputation score associated with the access point of the devices present in the network. Such dynamic updation of the reputation of the access points enables the devices in pairing with rogue third party devices.

The specification has described system and method for establishing a secure access connection with electronic devices. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of establishing a secure access connection with electronic devices, the method comprising:
   receiving, by a connection manager of a host device, a request for establishing the secure access connection, from an electronic device, via an access point associated with the electronic device through which communication messages to and from the host device are routed;
   dynamically determining, by the connection manager, at least a local reputation score associated the access point, based on at least a plurality of parameters and pre-defined weights assigned to each of the plurality of parameters, wherein the plurality of parameters comprises a combination of encryption modes used for communication via the access point, a data transfer speed associated with the access point, a delay in data transfer associated with the access point, a jitter associated with the access point, an uptime of the access point, an availability status of the access point for communication, and a number of network nodes connected to the access point;
   dynamically updating, by the connection manager, the local reputation score based on at least one of a change in the plurality of parameters and a user defined time interval;
   determining, by the connection manager, a global reputation score based on a weighted analysis of a user defined reputation score and previously determined local reputation scores, wherein the global reputation score is updated based on the dynamically determined local reputation score; and
   establishing, by the connection manager, the secure access connection between the host device and the electronic device, via the access point, based on a comparison of the updated global reputation score with a pre-defined threshold.

2. The method of claim 1, wherein the request for establishing the secure access connection is obtained based on a scanning of a vicinity of the host device.

3. The method of claim 1, further comprising generating a unique identifier corresponding to the access point.

4. The method of claim 3, further comprising storing the determined local reputation score in a local database corresponding to the generated unique identifier.

5. The method of claim 1, further comprising retrieving a global reputation score associated with the access point, from a global database, for establishing the secure access connection.

6. The method of claim 5, wherein the weighted analysis is based on user configurable weights.

7. A system for establishing a secure access connection with electronic devices, the system comprising:
   a processor; and
   a memory communicatively coupled to the processor, wherein the memory stores the processor-executable instructions, which, on execution, causes the processor to:
      receive a request for establishing the secure access connection, from an electronic device, via an access point associated with the electronic device through which communication messages to and from the host device are routed;
      dynamically determine at least a local reputation score associated with the access point, based on at least a plurality of parameters and pre-defined weights assigned to each of the plurality of parameters, wherein the plurality of parameters comprises a combination of encryption modes used for communication via the access point, a data transfer speed associated with the access point, a delay in data transfer associated with the access point, a jitter associated with the access point, an uptime of the access point, an availability status of the access point for communication, and a number of network nodes connected to the access point;
      dynamically update the local reputation score based on at least one of a change in the plurality of parameters and a user defined time interval;
      determine a global reputation score based on a weighted analysis of a user defined reputation score and previously determined local reputation scores, wherein the global reputation score is updated based on the dynamically determined local reputation score; and establish the secure access connection between the host device and the electronic device, via the access point, based on a comparison of the updated global reputation score with a pre-defined threshold.

8. The system of claim 7, wherein the processor is further configured to receive the request for establishing the secure access connection based on a scanning of a vicinity of the host device.

9. The system of claim 7, the processor is further configured to generate a unique identifier corresponding to the access point.

10. The system of claim 9, the processor is further configured to store the determined local reputation score in a local database corresponding to the generated unique identifier.

11. The system of claim 7, the processor is further configured to retrieve a global reputation score associated with the access point, from a global database, for establishing the secure access connection.

12. The system of claim 11, wherein the weighted analysis is based on user configurable weights.

13. The system of claim 7, wherein the connection between host device and the electronic device is established, via an Internet of Things (IoT) gateway.

14. A non-transitory computer-readable medium storing instructions for establishing a secure access connection with electronic devices, wherein upon execution of the instructions by one or more processors, the processors perform operations comprising:

receiving a request for establishing the secure access connection, from an electronic device, via an access point associated with the electronic device through which communication messages to and from the host device are routed;

dynamically determining at least, a local reputation score associated the access point, based on at least a plurality of parameters and pre-defined weights assigned to each of the plurality of parameters, wherein the plurality of parameters comprises a combination of encryption modes used for communication via the access point, a data transfer speed associated with the access point, a delay in data transfer associated with the access point, a jitter associated with the access point, an uptime of the access point, an availability status of the access point for communication, and a number of network nodes connected to the access point;

dynamically updating the local reputation score based on at least one of a change in the plurality of parameters and a user defined time interval;

determining a global reputation score based on a weighted analysis of a user defined reputation score and previously determined local reputation scores, wherein the global reputation score is updated based on the dynamically determined local reputation score; and establishing the secure access connection between the host device and the electronic device, via the access point, based on a comparison of the updated global reputation score with a pre-defined threshold.

* * * * *